(12) United States Patent
Liu et al.

(10) Patent No.: US 12,555,501 B1
(45) Date of Patent: Feb. 17, 2026

(54) DISPLAY SYSTEM CALIBRATION

(71) Applicant: CHRISTIE DIGITAL SYSTEMS USA, INC., Cypress, CA (US)

(72) Inventors: Elin Y. Liu, Toronto (CA); Peter Anthony Van Eerd, Guelph (CA); Nicholai Wasilka, Kitchener (CA); Jarrod Griffin Pas, Kitchener (CA)

(73) Assignee: CHRISTIE DIGITAL SYSTEMS USA, INC.

( * ) Notice: Subject to any disclaimer, the term of this patent is extended or adjusted under 35 U.S.C. 154(b) by 0 days.

(21) Appl. No.: 18/958,871

(22) Filed: Nov. 25, 2024

(51) Int. Cl.
*G09G 3/00* (2006.01)
*G06T 7/00* (2017.01)
*G06T 7/73* (2017.01)
*G06T 7/80* (2017.01)
*G06T 7/90* (2017.01)

(52) U.S. Cl.
CPC ........... *G09G 3/001* (2013.01); *G06T 7/0002* (2013.01); *G06T 7/73* (2017.01); *G06T 7/80* (2017.01); *G06T 7/90* (2017.01); *G06T 2207/10024* (2013.01); *G09G 2320/0626* (2013.01); *G09G 2320/0693* (2013.01)

(58) Field of Classification Search
CPC ....... G06T 7/70–90; G06T 2207/10024; G06T 7/0002; G09G 3/001; G09G 2320/0626; G09G 2320/0693
See application file for complete search history.

(56) References Cited

U.S. PATENT DOCUMENTS

| | | |
|---|---|---|
| 10,225,483 B1 | 3/2019 | Hong et al. |
| RE48,595 E | 6/2021 | Lee et al. |
| 11,711,500 B1 | 7/2023 | Post et al. |
| 2020/0382760 A1 | 12/2020 | Zhang |
| 2021/0211566 A1* | 7/2021 | Guo ....................... H04N 23/73 |
| 2023/0247185 A1* | 8/2023 | Post ................... H04N 1/00087 348/744 |
| 2024/0371038 A1* | 11/2024 | Zhang ....................... G06T 7/85 |
| 2025/0124884 A1* | 4/2025 | Sharma ................ G09G 3/3426 |
| 2025/0239191 A1* | 7/2025 | Chung .................. G09G 3/006 |
| 2025/0246167 A1* | 7/2025 | Shiraishi .................. G09G 3/32 |

* cited by examiner

*Primary Examiner* — Hang Lin
(74) *Attorney, Agent, or Firm* — Perry + Currier

(57) ABSTRACT

A method for calibrating a display system is provided. A test pattern for display is presented. The test pattern includes a plurality of blobs. Using a camera, an image comprising one or more of the plurality of blobs in the presented test pattern is captured. An exposure calibration parameter is calculated using a ratio of a maximum brightness level capable of being read by the camera to a maximum brightness level determined from the captured one or more blobs in the test pattern. The exposure of the camera of the display system is calibrated using the exposure calibration parameter. A display system configured to implement the method is also provided.

25 Claims, 7 Drawing Sheets

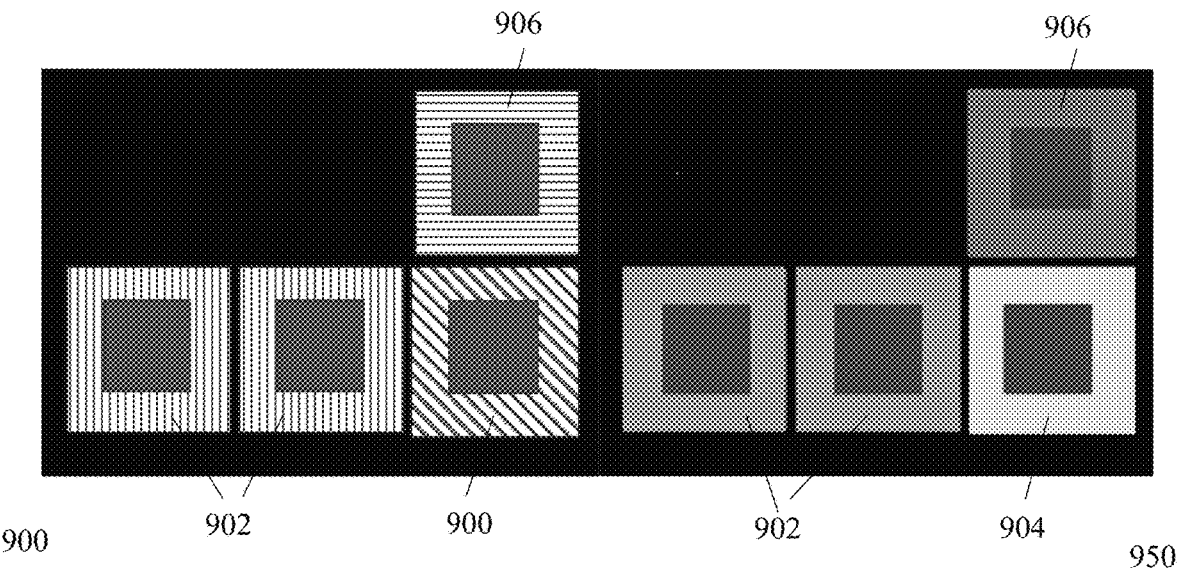
Fig. 9a    Fig. 9b
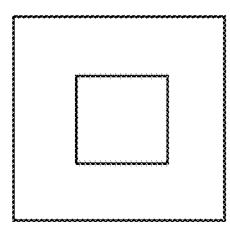 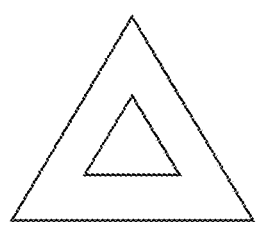 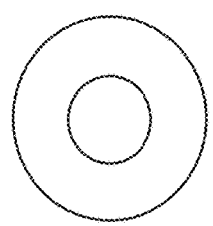
1004    1002    1006
1000
Fig. 10

DISPLAY SYSTEM CALIBRATION

The description relates generally to systems and methods for calibrating display systems and specifically for automatically calibrating exposure of a camera component of the display system using a single captured image.

BACKGROUND

Display systems typically include one or more projectors, cameras, or display devices. The display systems may be employed to project videos and images on a variety of different surfaces. In projector camera systems, structured light is used to determine information about the system. The structured light needs to be properly exposed in camera images to properly determine information about the system.

The most common method of automatic exposure is iterative, using methods such as hill climbing, for example, to determine the correct exposure for the system. In such methods, a picture is taken at an initial exposure and the picture is analyzed to determine if the exposure should be higher or lower. A new picture is taken at a new exposure. Depending on the analysis, the new exposure may be higher or lower than the previous picture. The new picture is analyzed to determine if the new exposure should be higher or lower. New pictures are repeatedly taken and analyzed until an adequate exposure is found.

Another method of automatic exposure involves taking multiple pictures at different exposures. The pictures at the different exposure are combined to create a camera image that is combination of all the different exposures. This process is referred to as high dynamic range (HDR).

Iterative approaches and HDR are slow because they take multiple images. Also, they put a strain on the network due to an increased number of images that need to be communicated.

Accordingly, it is an object of the present disclosure to obviate or mitigate at least some of these disadvantages.

SUMMARY

In accordance with an embodiment, there is provided a method for calibrating a display system. A test pattern is presented for display. The test pattern includes a plurality of blobs. An image comprising one or more of the plurality of blobs in the displayed test pattern is captured using a camera. An exposure calibration parameter is calculated using a ratio of a maximum brightness level capable of being read by the camera to a maximum brightness level determined from the captured one or more blobs in the test pattern. The exposure of the display system is calibrated using the exposure calibration parameter.

In accordance with another embodiment, there is provided a display system comprising: a device for displaying a test pattern including a plurality of blobs; a camera for capturing an image comprising one or more of the plurality of blobs in the displayed test pattern; a processor configured to: calculate an exposure calibration parameter using a ratio of a maximum brightness level capable of being read by the camera to a maximum brightness level determined from the captured one or more blobs in the test pattern; and calibrate the exposure of the display system using the exposure calibration parameter.

In some embodiments, when the image is underexposed, the maximum brightness level is measured from the capture image. In some embodiments, when the image is overexposed, the maximum brightness level is calculated as a theoretical maximum brightness level of displayed light based on the maximum brightness level measured from the capture image. The theoretical maximum brightness level may be calculated by measuring an intermediate brightness level and, considering a base value of light read by the camera, extrapolating the intermediate brightness level to provide the theoretical maximum brightness level.

In some embodiments, at least one of the plurality of blobs comprises an inner area and an outer area surrounding the inner area, the inner area having a brightness level proximal a first end of a brightness range and the outer area having a brightness level proximal a second, opposite end of the brightness range. The outer area may have a brightness level at a maximum level of the brightness range and the inner area may have a brightness level at or near a minimum level of the brightness range. The blob may include a clear boundary between the inner area and the outer area. The blob may include a ramp that transitions between the inner area and the outer area.

In some embodiments, the blobs may further include a background area surrounding the outer area, wherein the background area has a brightness level at the opposite end of the brightness range from the outer area. The blob may include a clear boundary between the background area and the outer area.

In some embodiments, the blobs may be arranged in an asymmetric pattern; blobs at different positions within the asymmetric pattern may be displayed with different colours; and the colours may be identified by the detected position of the blobs in the asymmetric pattern.

In some embodiments, the blobs may have different shapes; blobs with different shapes may be displayed with different colours; and the colours may be identified by the detected shape of the blobs.

In some embodiments, a plurality of local exposure calibration parameters may be calculated for corresponding regions and a global exposure calibration parameter may be calculated as a blend of the plurality of local exposure calibration parameters. A ratio of the plurality of local exposure calibration parameters to the global exposure calibration parameters may be used to calculate corresponding local thresholding values.

BRIEF DESCRIPTION OF THE DRAWINGS

Embodiments will now be described by way of example only with reference to the following drawings in which:

FIG. 9a to 9b is an example of a plurality of blobs of different colours arranged in an asymmetric pattern.

FIG. 10 is an example of plurality of blobs of different colours represented as different shapes.

DETAILED DESCRIPTION OF THE PREFERRED EMBODIMENTS

Figure 1:
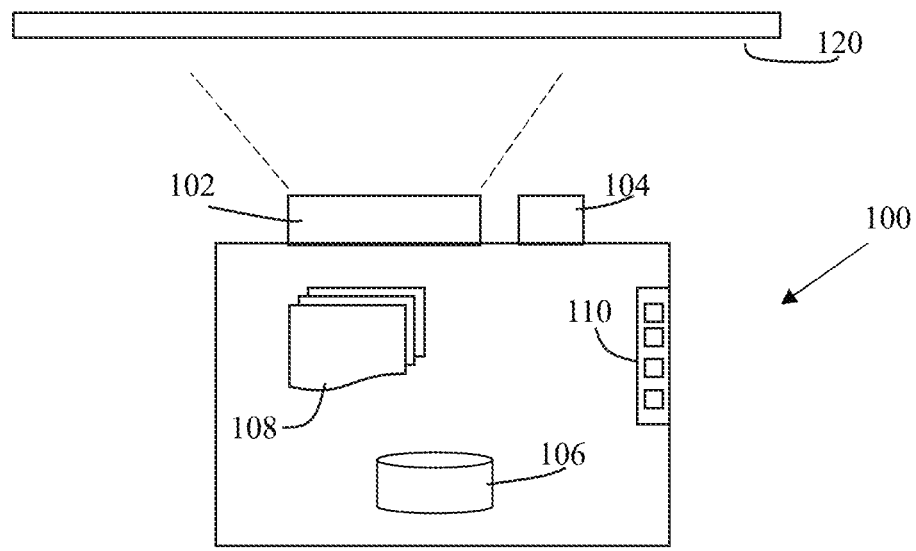
FIG. 1 is a block diagram of a display system.

For convenience, like numerals in the description refer to like structures in the drawings. Referring to FIG. 1, a block diagram of a display system is illustrated generally by numeral 100. The display system 100 comprises a projector 102, a camera 104, memory 106, a processor 108. The display system 100 may also comprise a communications interface 110 and/or an input/output device (not shown).

The projector 102 is configured to project light or images onto a surface 120. In some embodiments, the surface can be a screen, wall, table, or other flat or three-dimensional (3D) object. The projector 102 serves as the output, displaying visual information. In some embodiments, the visual information output from the projector 102 may be dynamically updated based on input received from the camera 104.

The camera 104 captures images of the surface 120. The captured images include the image projected onto the surface 120 by the projector 102. The captured images may also include the surrounding environment of the surface 120. The camera 104 may also capture video. The camera 104 acts as the eye of the display system 100, allowing it to monitor changes, detect movements, or record feedback from users.

In some embodiments, the processor 108 may be a central processing unit (CPU), a microcontroller, a processing core, or similar. The processor 108 may include a single processor 108 or multiple co-operating processors 108. In some embodiments, the functionality implemented by the processor 108 may be implemented by one or more specially designated hardware and firmware components, such as a field-programmable gate array (FPGA), an application-specific integrated circuit (ASIC), a graphics processing unit (GPU), or the like. In some embodiments, the processor 108 may be a special purpose processor which may be implemented via the dedicated logic circuitry of an ASIC or FPGA to enhance the processing speed of the calibration operation discussed herein.

The processor 108 is communicatively coupled to the memory 106. The memory 106 is a non-transitory computer-readable storage medium. In some embodiment, the memory may include a combination of volatile memory, such as random access memory (RAM) for example, and non-volatile memory, such as read only memory (ROM), electrically erasable programmable read only memory (EEPROM), or flash memory, for example.

The memory 106 stores data including applications, application data, configuration data, calibration date, and the like. For example, a calibration application is stored in the memory. When executed by the processor 108, the calibration application causes the processor to calibrate the display system 100 as will be described in greater detail below. The calibration application may be implemented as a standalone application or as a suite of distinct applications.

The communications interface 110 is communicatively coupled with the processor 108. The communications interface 110 includes suitable hardware, such as transmitters, receivers, transceivers, network interface controllers, and the like, to facilitate communication between the display system 100 and other computing devices. The specific components of the communications interface 110 can be selected based on the type of communication medium and protocols that are being used. In some embodiments, the camera 104 may not be in an integrated unit with the projector 102. In such embodiments, the communications interface 110 is configured to facilitate communication of images from the camera 104 to the processor 108 and the memory 106.

The camera 104 is calibrated to a target exposure. In some embodiments, the information needed from the capture image is binary, such as ON vs OFF, for example. In such embodiments, any exposure that can differentiate the binary ON from OFF is sufficient. In some embodiments, the target exposure is an optimal exposure to gain as much information from the captured images as possible.

If the exposure settings for the camera 104 cause too little light to reach the sensor, the resulting image will be underexposed. An underexposed image is dark with a possible loss of shadow details. In contrast if the exposure settings for the camera 104 allow too much light to reach the sensor, the resulting image will be overexposed. An overexposed image is bright with potential loss of highlight details.

As will be described, the camera 104 is calibrated to the target exposure. As discussed above, in some embodiments, it is desirable to distinguish shades of grey within the image. Accordingly, the target exposure will be as high as possible while reducing the likelihood of overexposing the image. Thus, the image captured by camera 104 is not so overexposed as to clip off data on the higher end of the brightness range of the projected light. In some embodiments, it is unnecessary to distinguish shades of gray and binary information is desired. The target exposure can be set to a lower value, as long as there is sufficient exposure to distinguish between ON (light projected) and OFF (no light projected). This lower value for the target exposure may improve the speed at which the image is captured. In some embodiments, it is desirable to see details in low light shadows. The target exposure can be set at a high value. This results in clipping the higher end of the brightness range of the projected light and losing information contained therein. Accordingly, this approach should be considered when the information contained in the higher end of the brightness range of the projected light is of less value than the information contained in the lower end of the brightness range of the projected light.

Figure 2:
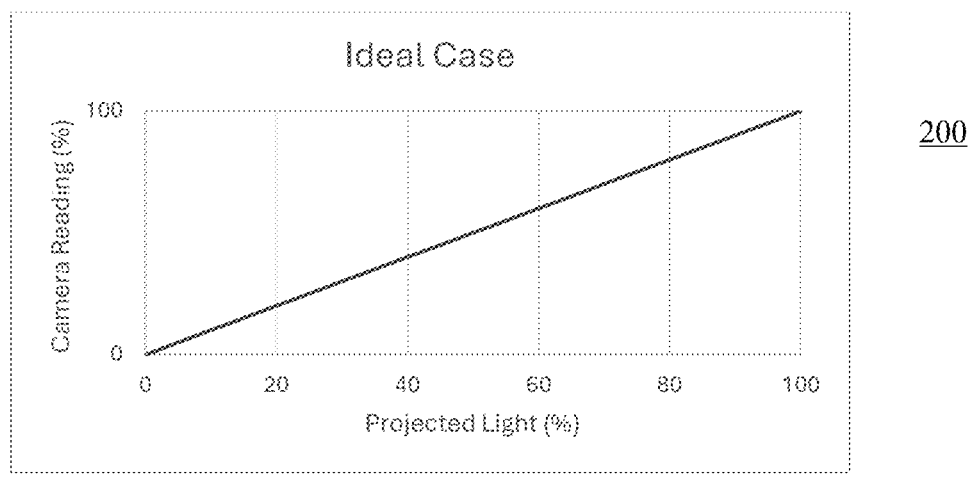
FIG. 2 is a graph illustrating an ideal relationship between projected and captured light.

Referring to FIG. 2, a graph illustrating an ideal relationship between the projected light from the projector 102 and the light captured by the camera 104 at an ideal exposure is illustrated generally by numeral 200. As illustrated, the projected light increases linearly from 0 to 100%. Similarly, the light captured by the camera increases linearly from 0 to 100%. As will be appreciated, in some embodiments the projected light may not increase linearly, but in a curve. In such embodiments, the curve is known based on projector model or can be determined from measurements, third party sources, or the like. As illustrated, when the projector 102 is not projecting any light, the camera 104 reads no light. When the projector 102 projects light at a maximum brightness, the camera 104 reads the light at the maximum brightness of the camera 104.

The ideal relationship 200 assumes that there is no other light source that can affect the amount of light read by the camera 104. Practically, this is difficult to achieve as there are often secondary sources of ambient light. For example, natural light (such as sunlight, moonlight, starlight, and reflected light), artificial light (such as ceiling lights, wall sconces, and diffused lamps), and environmental light (such as street lights, traffic lights, and other outdoor light sources) may also be captured by the camera 104. Accordingly, even though the projector 102 may not project any light, the camera 104 may capture a non-zero base value of light.

Figure 3:
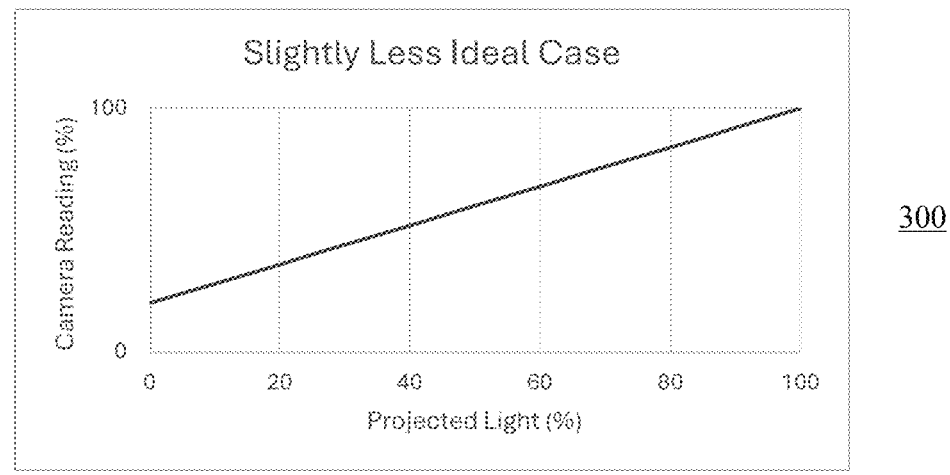
FIG. 3 is a graph illustrating a relationship between projected and captured light in the presence of ambient light.

Referring to FIG. 3, a graph illustrating a relationship between the projected light from the projector 102 and the light captured by the camera 104 in the presence of ambient light is illustrated generally by numeral 300. As illustrated, when the projector 102 is not projecting any light, the camera 104 reads the base value of light. When the projector 102 projects light at a maximum brightness, the camera 104 reads the light at the maximum brightness of the camera 104.

Figure 4:
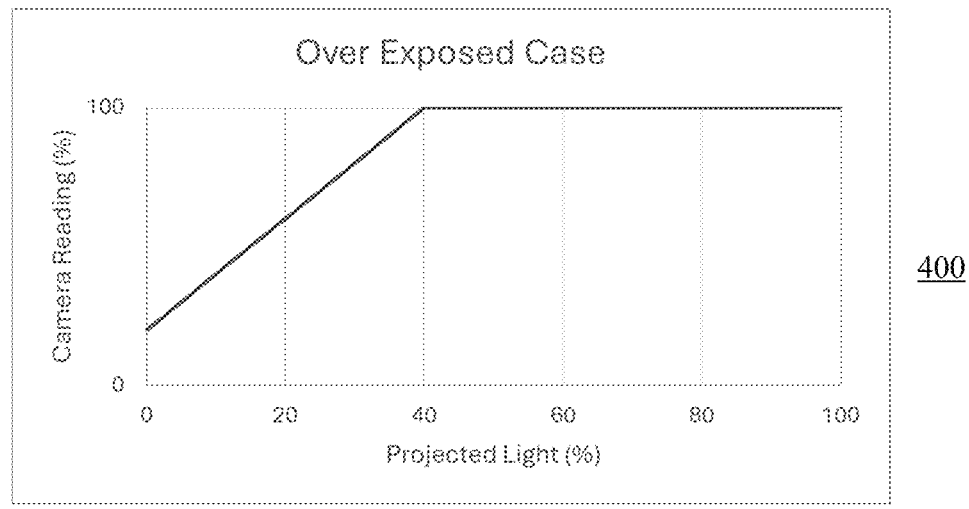
FIG. 4 is a graph illustrating a relationship between projected and captured light in an overexposed image.

As described above, if the exposure settings cause the image to be overexposed then the captured image may be clipped at the brighter end of the projected light. Referring to FIG. 4, a graph illustrating a relationship between the projected light from the projector 102 and the light captured by the camera 104 when the image is overexposed is illustrated generally by numeral 400. In the illustrated example, when the projector 102 is not projecting any light, the camera 104 reads a value above the base value of light. Further, the camera 104 reads the light at the maximum brightness of the camera 104 when the projector 102 projects light only at approximately 40% of the maximum brightness of the projector 102. Since the camera 104 reaches its maximum brightness at 40% of the projector maximum brightness, it will continue to do so for the entire range of 40% to 100% of the projector maximum brightness. At 40% brightness, the camera 104 will read 100% brightness. From light projected from the projector 102 at 40% brightness to light projected at 100% brightness, the quality of the image captured by the camera will decrease as the added light from the projector 102 will result in image artifacts.

Figure 5:
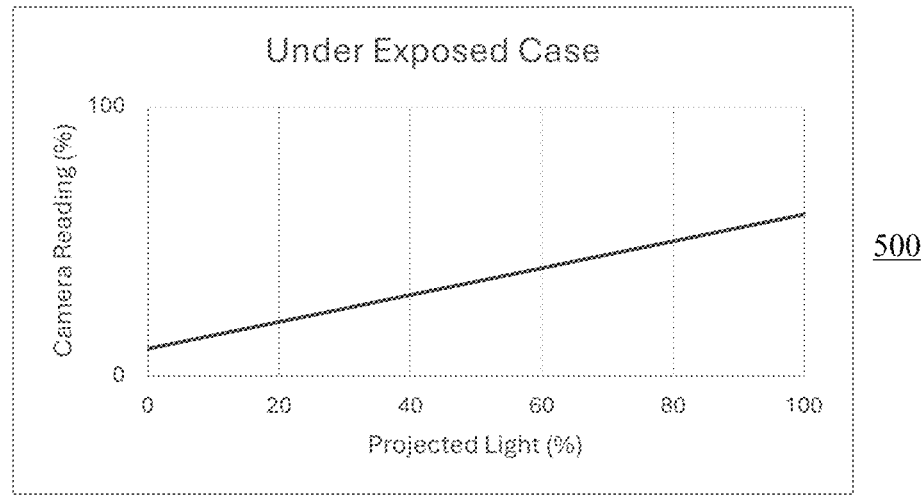
FIG. 5 is a graph illustrating a relationship between projected and captured light in an underexposed image.

Conversely, referring to FIG. 5, a graph illustrating a relationship between the projected light from the projector 102 and the light captured by the camera 104 when the image is underexposed is illustrated generally by numeral 500. In the illustrated example, when the projector 102 is not projecting any light, the camera 104 reads a value below the non-zero base value of light. When the projector 102 projects light at a maximum brightness, the camera 104 reads the light at a value below the maximum brightness of the camera 104.

Figure 6:
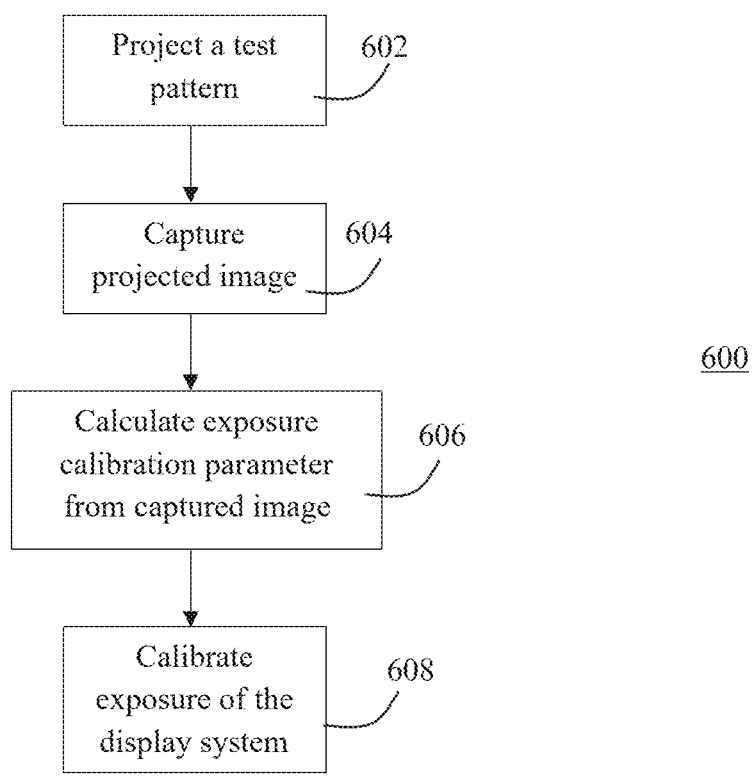
FIG. 6 is a flowchart illustrating a method for calibrating the display system.

Referring to FIG. 6, a flow chart illustrating a method for calibrating the display system 100 is illustrated generally by numeral 600. At 602, the projector 102 is used to project a test pattern for display. The test pattern may be projected onto one or more different surfaces. The test pattern includes a plurality of blobs. At 604, the camera 104 is used to capture an image. The image includes one or more of the plurality of blobs displayed in the test pattern. At 606, an exposure calibration parameter is calculated using a ratio of a maximum brightness level capable of being read by the camera to a maximum brightness level determined from the captured one or more blobs in the test pattern. At 608, the exposure calibration parameter is used to calibrate the exposure of the camera 104 of the display system 100. In some embodiments, the exposure is controlled by the duration at which the shutter of the camera 104 stays open.

Figure 7:
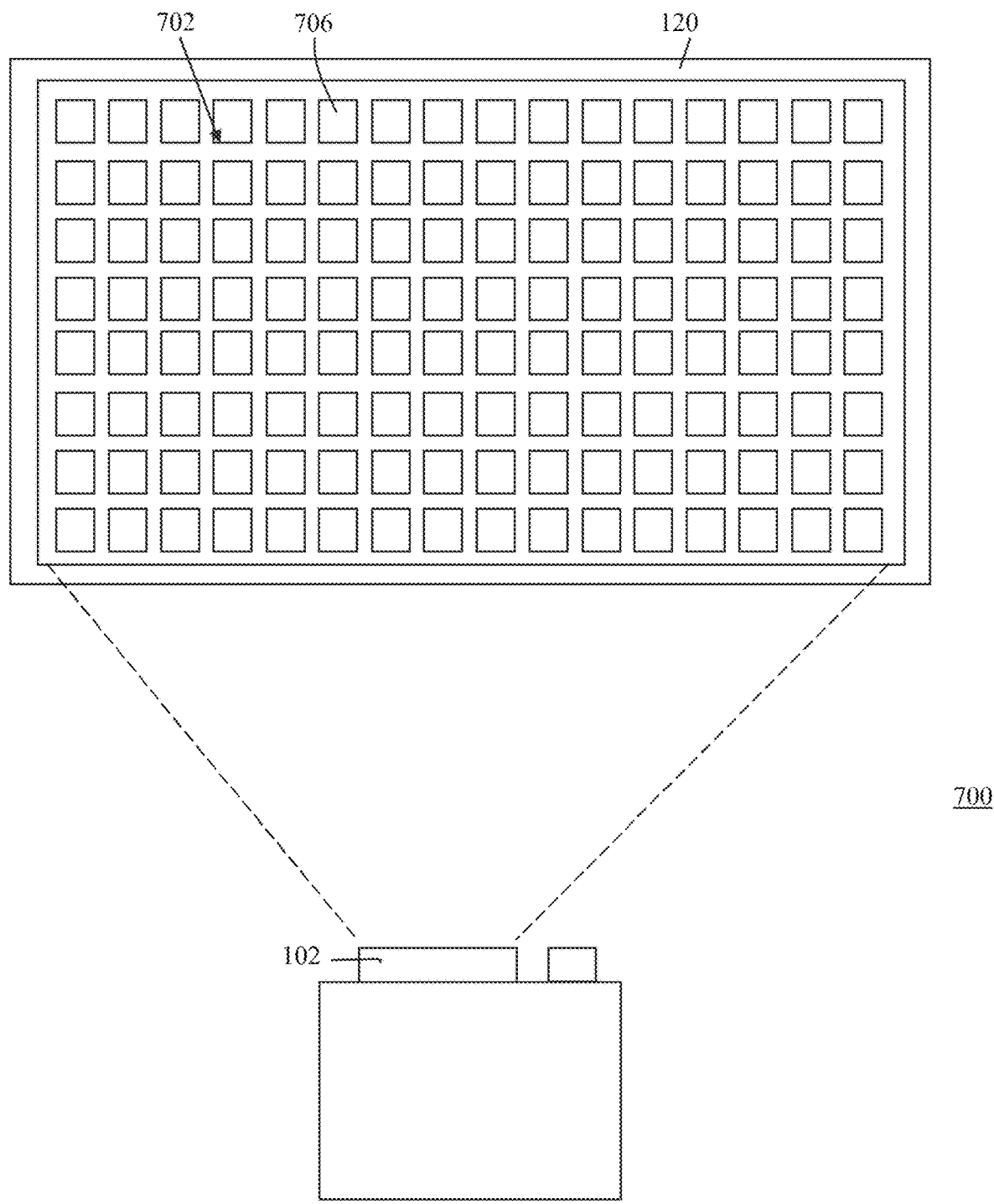
FIG. 7 is a block diagram of the display system projecting a plurality of blobs onto a surface.

Referring to FIG. 7, a block diagram of the display system 100 projecting an image is illustrated generally by numeral 700. The projector 102 is configured to project the test pattern 702 onto one or more surfaces 120. Accordingly, the test pattern 702 includes features to facilitate the calibration of the projector 102 with respect to exposure, color, luminance, geometric alignment, distortion, focus, color convergence, and the like. Thus, the test pattern 702 is formed of a plurality of blobs 706. The blobs 706 may be ramps, squares, circles, other geometric shapes, or other suitable forms. Further, each of the blobs 706 may have the same form as the other blobs 706, or the blobs 706 may have different forms.

Figure 8A:
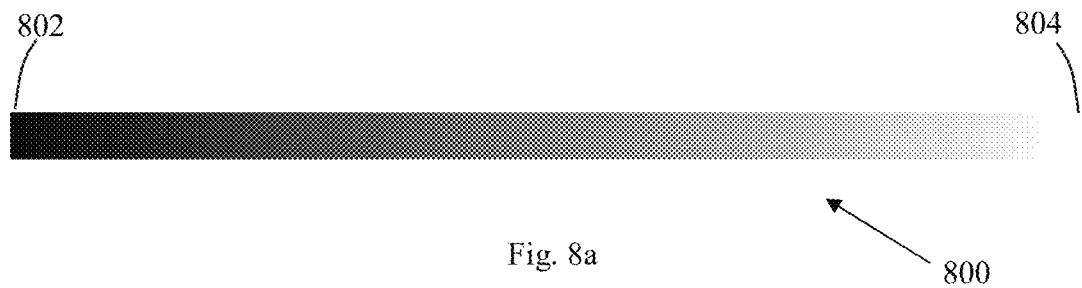
FIGS. 8a to 8c are examples of different types of blobs that may be used.

Referring to FIG. 8a, a linear ramp shaped blob is illustrated generally by numeral 800. In some embodiments, the linear ramp blob 800 begins at one end 802 with zero light projected and increases linearly to an opposite end 804 with 100% light projected. Note, however, that it would be difficult to determine where the linear ramp blob 800 ends, when shown against a white background. Similarly, it would be difficult to determine where the linear ramp blob 800 begins, when shown on a black background. Accordingly, in some embodiments, markers are placed at opposite ends of the linear ramp blob 800. The markers can take the form of a predefined symbol, character, shape, grouping of dots, or other, known identifier. The distance between the markers and a corresponding end of the linear ramp blob 800 is known. Accordingly, the markers can be used to identify the beginning and end of the linear ramp blob 800, regardless of the colour of the background. In some embodiments, the markers are projected using a mid-range brightness level. In some embodiments, the marker proximal the one end 802 is projected at or near 100% brightness and the marker proximal the opposite end 802 is projected at or near zero brightness.

Figure 8B:
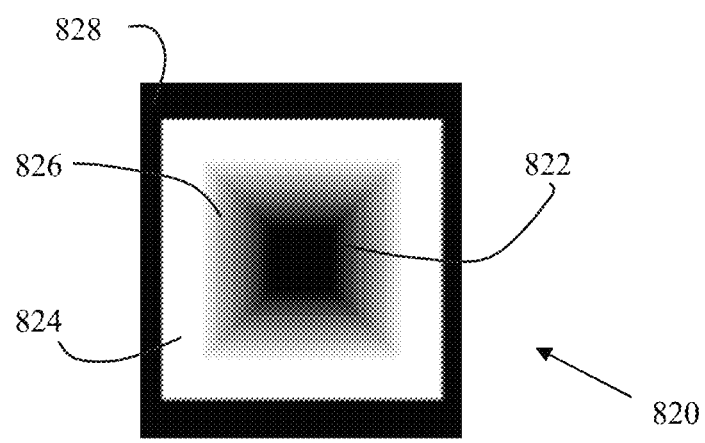

Referring to FIG. 8b, a pyramid shaped blob is illustrated generally by numeral 820. The pyramid blob comprises an inner area 822 and an outer area 824 surrounding the inner area 822. The inner area 822 has a brightness level proximal a first end of a brightness range. The outer area 824 has a brightness level proximal a second, opposite end of the brightness range. In some embodiments, the outer area 824 has a brightness level at a maximum level of the brightness range and the inner area 822 has a brightness level at or near a minimum level of the brightness range.

In the illustrated example, the inner area 822 has a brightness level at zero light projected and the outer area 824 has a brightness level at 100% light projected. In the illustrated example, the pyramid blob 820 is substantially square. Further, in the illustrated example, the pyramid blob 820 comprises a ramp transition 826 between the inner area 822 and the outer area 824.

In some embodiments, an inverted version of pyramid blob 820 can be used in which the inner area 822 has a brightness level at 100% light projected and the outer area 824 has a brightness level at zero light projected.

In some embodiments, the pyramid blob 820 further includes a background area 828 surrounding the outer area 824. The background area 828 has a brightness level at the opposite end of the brightness range from the outer area. Thus, in the illustrated example, the background area 828 has a brightness level at zero light projected. If an inverted version of the of the pyramid blob 820 is used, the background area 828 will have a brightness level at 100% light projected.

The pyramid blob 820 makes the start and end of the ramp transition 826 easier to find than for the linear ramp blob 800. Further, information other just exposure can be determined. Because the pyramid blob 820 is a smaller compact pattern, more local information can be determined.

Figure 8C:
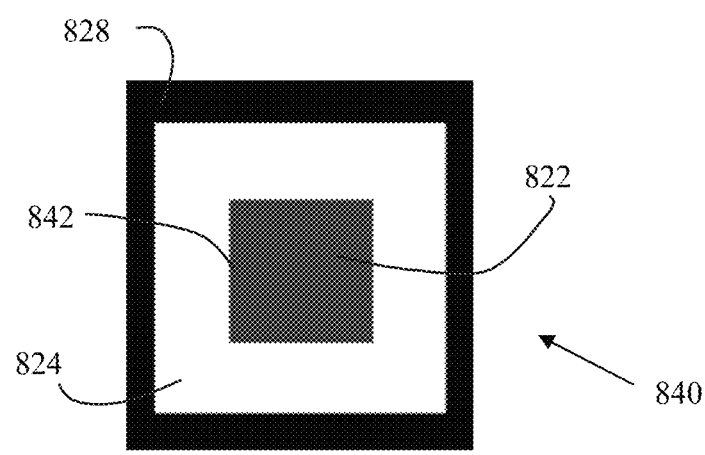

Referring to FIG. 8c, a donut shaped blob is illustrated generally by numeral 840. The donut blob 840 is similar to the pyramid blob. However, the donut blob 840 has a clear boundary 842 between the inner area 822 and the outer area 824 instead of the ramp transition 826. The lack of the ramp transition 826 allows the donut blob 840 to be more compact that the pyramid blob 820. Further, in the illustrated example, the inner area 822 has a brightness level that is proximal, but greater than, zero light projected.

In some embodiments, a pyramid blob 820 or donut blob 840 with a brighter outer area 824 and a darker inner area 822 helps differentiate projected light from other, external sources of light that might appear in the image. For example, the ambient lighting from secondary sources, reflections, and sometime camera noise may appear as noise blobs. To the camera 104, noise blobs are bright on the inside and dark on the outside. A blob that is pyramid and/or donut-shaped and dark in the middle is much less likely to be created by noise. Thus, using shapes with dark centers helps distinguish the intentional projected blobs from environmental noise blobs.

The exposure calibration parameter can be calculated by taking advantage of the linear nature of the projected light. As noted above, in some instances the projected light may be non-linear. However, in these instances although the calculations are slightly more complicated, depending on the nature of the curve, the principle is the same. In a worst-case scenario, the curve could be calculated using piecewise linear methods.

Once the camera has captured an image comprising one or more of the plurality of blobs, the image is processed. If the maximum brightness level determined from the captured blobs is less than the maximum level of brightness capable of being read by the camera, then the image is underexposed. The exposure calibration parameter (ECP) can be determined as the ratio of a maximum brightness level capable of being read by the camera to a maximum brightness level determined from the captured one or more blobs in the test pattern as:

$$\text{exposure calibration parameter} = \frac{100\% \text{ camera reading}}{\text{camera reading of } 100\% \text{ projected light}}$$

The exposure of the display system can then be calibrated as:

$$\text{exposure}_{display\ system} = (\text{current exposure})(\text{exposure calibration parameter})$$

Figure 11A:
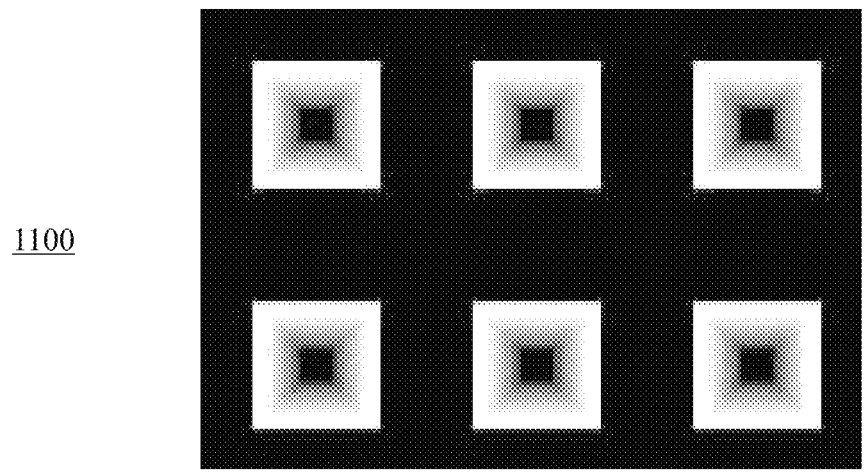
FIGS. 11a to 11c are example images of a plurality of blobs at different exposures.

Referring to FIG. 11a, an example image of a plurality of pyramid blobs 820 is illustrated generally by numeral 1100. The image illustrates what the camera 104 is expected to capture at the target exposure. In some embodiments, the brightness range read by the camera has a range from 0 to 255. Accordingly, in some embodiments, the maximum brightness at the target exposure will be read by the camera as 255 and the minimum brightness at the target exposure will be read by the camera as 0.

Figure 11B:
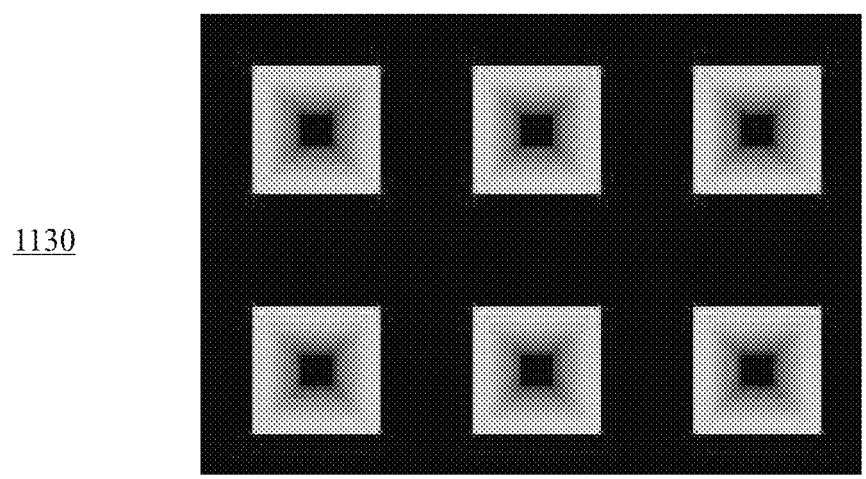

Referring to FIG. 11b, another example image of a plurality of pyramid blobs 820 is illustrated generally by numeral 1130. In this example the image 1130 is an underexposed version of the image at the target exposure 1100. In the illustrated example, the assumed input exposure is 100,000. However, the maximum brightness read by the camera is 195. The minimum brightness observed by the camera is 0. Accordingly, it can be determined that the image 1130 is underexposed. The exposure calibration parameters can be calculated as:

$$\text{exposure calibration parameter} = \frac{250}{195} = 1.28$$

In this example, the exposure is calculated based on a brightness of 250, rather than the maximum brightness of 255, to reduce the likelihood of overexposing the image. The corrected exposure can be calculated as:

$$\text{exposure}_{display\ system} = (100{,}000)(1.28) = 128{,}000$$

The expected new maximum brightness to be read by the camera 104 under the adjusted exposure is 195*1.28=249.6. Similarly, the expected new minimum brightness to be read by the camera 104 under the adjusted exposure is New Min=0*1.28=0.

If the maximum brightness level determined from the captured blobs is the maximum level of brightness capable of being read by the camera, then the image may be overexposed. To confirm whether the image is overexposed, the processor 108 compares the brightness level captured by the camera for portions of the blob that are expected to be below the maximum brightness level. If these portions are also captured by the camera 104 at the maximum brightness level, then the image is overexposed.

If the image is overexposed case, it is a bit more complex to determine the exposure calibration parameter since the maximum brightness level determined from the captured does not correspond uniquely with the maximum brightness level capable of being read by the camera. Accordingly, a theoretical maximum exposure level is calculated based on the maximum brightness level measured from the capture image. The theoretical maximum brightness level of the projected light is used to determine the exposure calibration parameter as follows:

$$\text{exposure calibration parameter} = \frac{100\% \text{ camera reading}}{\text{theoretical reading of } 100\% \text{ projected light}}$$

The theoretical maximum brightness level is calculated by measuring an intermediate brightness level and, considering a base value of light read by the camera, extrapolating the intermediate brightness level to provide the theoretical maximum brightness level. The intermediate brightness level is selected so that the intermediate projected light value is not clipped in the captured image. The theoretical maximum exposure level can then be calculated as:

$$\text{theoretical camera reading of } 100\% \text{ projected light} = \frac{\text{camera reading of intermediate projected light} - \text{base light}}{\text{intermediate projected light}} + \text{base light}$$

The above equation is derived from the geometry of the blobs. Consider, for example, the pyramid blob 820. The geometry of the pyramid blob 820 and the proportional area of the outer area 824, the ramp transition 826, and the inner area 822. When overexposed, the outer area 824 will be seen by the camera as wider than how it was projected. This is because part of the ramp transition 826 will be seen as 100% brightness instead of a lower brightness due to overexposure.

Accordingly, it can be determined how much of the ramp transition 826 appears as the outer area 824 to the camera. Thus, for example, if the camera 104 starts reading 100% brightness at 80% off the projected brightness, the border between the outer area 824 and the ramp transition 826 will appear at 80% on the ramp transition 826 instead of 100%. Thus, the ramp transition 826 will be approximately 80% of the size of the expected ramp transition 826. This is referred to as the ramp ratio. Accordingly, the theoretical camera reading of 100% projected light can be re-formulated as:

theoretical camera reading of 100% projected light =
$$\frac{\text{max observed} - \text{min observed}}{\text{ramp ratio}} + \text{min observed}$$

Figure 11C:
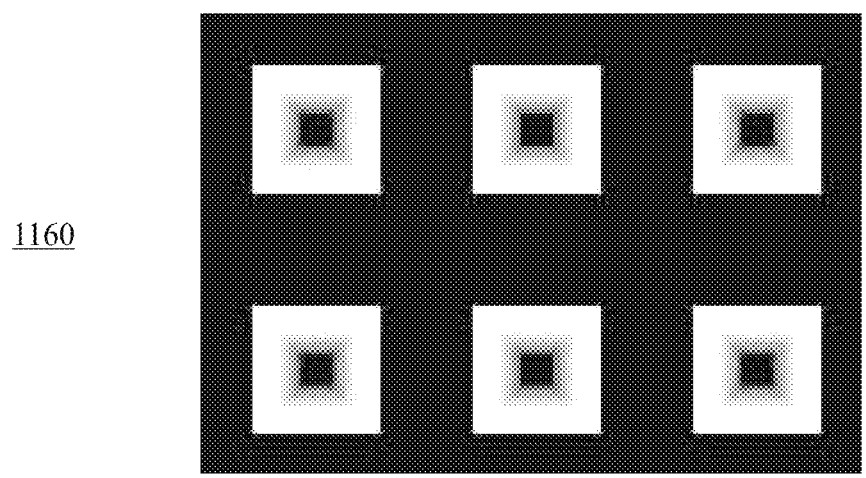

Referring to FIG. 11c, yet another example image of a plurality of a plurality of pyramid blobs 820 is illustrated generally by numeral 1160. In this example the image 1160 is an overexposed version of the image at the target exposure 1100. In the illustrated example, the assumed input exposure is 100,000. The maximum brightness read by the camera is 255. The minimum brightness observed by the camera is 20. The border between the outer area 824 and the ramp transition 826 appears at 64% on the ramp transition 826 instead of 100%. Accordingly, it can be determined that the image 1130 is overexposed. The theoretical camera reading of 100% projected light can be calculated as:

theoretical camera reading of 100% projected light =
$$\frac{255 - 20}{64} + 20 \sim 387$$

The exposure calibration parameter can be calculated as:

$$\text{exposure calibration parameter} = \frac{255}{387} = 0.645$$

The corrected exposure can be calculated as:

$$\text{exposure}_{display\ system} = (100,000)(0.645) = 64,500$$

The expected new maximum brightness to be read by the camera 104 under the adjusted exposure is 255. Similarly, the expected new minimum brightness to be read by the camera 104 under the adjusted exposure is New Min=20*0.645=13.

Projected light may be projected onto different surfaces 704 and at different angles. Additionally, different regions of the surfaces 704 may have different reflective properties for many different reasons. Therefore, each local region of the image may have its own local target exposure calibration parameter. A global target exposure calibration parameter for the entire image can be calculated. In some embodiments, the global target exposure calibration parameter is a blend of the local exposure calibration parameters for all the local regions. In some embodiments, the local target calibration parameters are averaged to obtain the global target exposure calibration parameter. In some embodiments, some of the local target exposure calibration parameters are weighted more than other local target exposure calibration parameters. For example, local target exposure calibration parameters in the center of the image may be weighted more than local target exposure calibration parameters at the edge of the image or vise versa. To facilitate determining the global target exposure calibration parameter, patterns are used so that the local regions can be identified. Once determined, the local exposure calibration parameter can then be associated with its identified region of interest in the image. In some embodiments, the patterns are easily identifiable regardless of the initial exposure of the image. This can involve using different color blobs, blobs with different geometric properties, asymmetric blob arrangements, unique blob arrangements, or any combination thereof.

Once the exposure has been calibrated, it is often useful to project and capture each primary colour, typically red, green, and blue, separately for correcting colour convergence, colour balance, and/or other projection properties. In some embodiment, the blobs 706 are arranged in an asymmetric pattern. Blobs at different positions within the asymmetric pattern are projected with different colours. The colours are identified by the detected position of the blobs 706 in the asymmetric pattern. Referring to FIG. 9a, an example of an asymmetric pattern is illustrated generally by numeral 900. The illustrated asymmetric pattern 900 includes two red blobs 902 positioned to the left of a green blob 904, which is positioned below a blue blob 906. As will be appreciated, various combinations of blobs 706 can be used to create different asynchronous patterns as long as they are easily identifiable. The asymmetrical pattern allows the display system 100 to determine which colour corresponds to which blob, even with a monochrome camera. Referring to FIG. 9b, a monochrome representation of the colours illustrated in FIG. 9a is illustrated generally by numeral 950.

In some embodiments, the blobs 706 have different shapes. Blobs 706 with different shapes are projected with different colours. The colours are identified by the detected shape of the blobs 706. Referring to FIG. 10, an example of different shaped blobs is illustrated generally by numeral 1000. In the illustrated example 1000 triangular blobs 1002 are red, square blobs 1004 are green, and circular blobs 1006 are blue. As will be appreciated, various shapes can be used as long as they are easily identifiable.

Thresholding can also benefit from the exposure calibration described above. Thresholding is a technique used in image processing used to separate objects or regions of interest from the background by converting an image into a binary form, where each pixel is either assigned a maximum or minimum value, typically representing black and white. This is often an initial step in processes like image segmentation, object detection, feature extraction, and the like.

Global thresholding is a mechanism in which a single threshold value is applied across the entire image. Pixels with intensities above the threshold are set to one color (usually white), and those below are set to another color (usually black). Adaptive (local) thresholding is a mechanism in which different threshold values are used for different regions of the image. This is particularly helpful for images with non-uniform lighting or shading. Adaptive thresholding can better handle varying lighting conditions within an image by adjusting the threshold value based on local pixel intensities.

Ideally, the threshold value should be the halfway point between a minimum and maximum pixel value expected to be read by the camera at the global exposure. At a good exposure, this would also be 50% of the projected light. To determine a local threshold value, a corresponding local target exposure calibration parameter is compared to the global exposure calibration parameter used for the image. That is, the local threshold value is calculated based on a ratio of the local target exposure calibration parameter and the global exposure calibration parameter. Thus, if the local target exposure calibration parameter is greater than the global exposure calibration parameter, the threshold value for thresholding will be greater than 50% of the projected light, since the projected light in that region is lower than the global projected light. Conversely, if the local target exposure calibration parameter is less than the global exposure calibration parameter, the threshold value for thresholding will be less than 50% of the projected light, since the projected light in that region is higher than the global projected light. In this manner, the camera reading of the projected light behaviour within a region is predicted so that a local threshold value can be calculated.

Consider, for example, that an exposure of 20 is ideal for a local area. That is, the exposure of 20 would cause 100% of the projected light to be 100% of the light read by the camera 104. However, the global exposure calibration parameter causes the exposure of the local area to become 10. As a result, in the local area 100% projected light will be 50% of the light read by camera 104. Accordingly, instead of the threshold of 50, the local threshold is set to 25.

Further, the threshold can be also adjusted based on the reading of the camera at zero light projected. Specifically, the threshold can be adjusted to the halfway point between the camera reading at zero projected light and the camera reading at 100% projected light. Referring again to the example image illustrated in FIG. 11*b*. In this example, the threshold (124) is calculated as half of the new maximum (249) less the new minimum (0). Note that in this example the values are truncated to expedite processing. In the example illustrated in FIG. 11*c*, the threshold (121) is calculated as half of the new maximum (255) less the new minimum (13). Similar to the calculations for the exposure calibration parameter, this calculation assumes linearity. If either camera 104 or projector 102 are non-linear, the calculations are adjusted for the non-linearity.

In the case where the initial camera image is so overexposed or so underexposed that the blobs 706 cannot be detected, another image can be taken. In this case, the camera exposure can be increased or reduced based on a predetermined constant. The predetermined constant can be unique to the type of camera, the camera sensitivity, the typical use case, or any combination thereof. For example, if it is determined that the image is so overexposed that no blobs 706 can be detected, the camera exposure can be decreased by a factor of 16, for example. Similarly, if the image is so underexposed that no blobs 706 can be detected, the camera exposure can be increased by a factor of 16, for example. This factor can change based on experimentation for each use case. For example, consider a brightness level for the inner area 822 of 12.5% ($\frac{1}{8}^{th}$ of the maximum brightness level). If the captured image is so overexposed that the camera reads the brightness level as 100%, then it can be determined that the exposure is at least eight times too high. Accordingly, in this example, a factor of 16 would be reasonable.

Although the description above described the display system as using a projector 102, it will be appreciated that other devices for presenting the image to user can be used. For example, display panels using technology such as Light Emitting Diode (LED), Organic Light Emitting Diode (OLED), Quantum Dot LED (QLED), and the like.

The scope of the claims should not be limited by the embodiments set forth in the above examples, but should be given the broadest interpretation consistent with the description as a whole. The terms "a", "an" and "one" are defined to mean "at least one", that is, these terms do not exclude a plural number of items, unless stated otherwise.

Terms such as "substantially", "generally" and "about", which modify a value, condition or characteristic of a feature of an example embodiment, should be understood to mean that the value, condition or characteristic is defined within tolerances that are acceptable for the proper operation of this embodiment for its intended application.

Unless stated otherwise, the terms "connected" and "coupled", and derivatives and variants thereof, refer herein to any structural or functional connection or coupling, either direct or indirect, between two or more elements. For example, the connection or coupling between the elements can be acoustical, mechanical, optical, electrical, thermal, logical, or any combinations thereof.

The expression "based on" is intended to mean "based at least partly on", that is, this expression can mean "based solely on" or "based partially on", and so should not be interpreted in a limited manner. More particularly, the expression "based on" could also be understood as meaning "depending on", "representative of", "indicative of", "associated with" or similar expressions.

"At least one" means one or more, and "a plurality of" means two or more. The term "and/or" describes an association relationship of associated objects, and indicates that three relationships may exist. For example, A and/or B may indicate the following three cases: Only A exists, both A and B exist, and only B exists, where A and B may be singular or plural. The character "/" usually indicates an "or" relationship between associated objects. "At least one of the following items (pieces)" or a similar expression thereof indicates any combination of these items, including a single item (piece) or any combination of a plurality of items (pieces). For example, "at least one of A, B, or C" includes A, B, C, A and B, A and C, B and C, or A, B, and C, and "at least one of A, B, and C" may also be understood as including A, B, C, A and B, A and C, B and C, or A, B, and C. In addition, unless otherwise specified, ordinal numbers such as "first" and "second" in embodiments of this application are used to distinguish between a plurality of objects, and are not used to limit a sequence, a time sequence, priorities, or importance of the plurality of objects.

A person skilled in the art should understand that embodiments of this application may be provided as a method, an apparatus (or system), computer-readable storage medium, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method for calibrating a display system, the method comprising:
    presenting a test pattern for display, the test pattern including a plurality of blobs;
    capturing, using a camera, an image comprising one or more of the plurality of blobs in the presented test pattern;
    calculating an exposure calibration parameter using a ratio of a maximum brightness level capable of being read by the camera to a maximum brightness level determined from the captured one or more blobs in the test pattern; and
    calibrating the exposure of the camera of the display system using the exposure calibration parameter.

2. The method of claim 1 wherein when the image is underexposed, the maximum brightness level is measured from the captured image.

3. The method of claim 1 wherein when the image is overexposed, the maximum brightness level is calculated as a theoretical maximum brightness level of presented light based on the maximum brightness level measured from the captured image.

4. The method of claim 3, wherein the theoretical maximum brightness level is calculated by measuring an intermediate brightness level and, considering a base value of light read by the camera, extrapolating the intermediate brightness level to provide the theoretical maximum brightness level.

5. The method of claim 1, wherein at least one of the plurality of blobs comprises an inner area and an outer area surrounding the inner area, the inner area having a brightness level proximal a first end of a brightness range and the outer area having a brightness level proximal a second, opposite end of the brightness range.

6. The method of claim 5, wherein the outer area has a brightness level at a maximum level of the brightness range and the inner area has a brightness level at or near a minimum level of the brightness range.

7. The method of claim 5, wherein the blob comprises a clear boundary between the inner area and the outer area.

8. The method of claim 5, wherein the blob comprises a ramp that transitions between the inner area and the outer area.

9. The method of claim 5, further comprising a background area surrounding the outer area, wherein the background area has a brightness level at the opposite end of the brightness range from the outer area.

10. The method of claim 9, wherein the blob comprises a clear boundary between the background area and the outer area.

11. The method of claim 5, wherein:
    the blobs are arranged in an asymmetric pattern;
    blobs at different positions within the asymmetric pattern are presented with different colours; and
    the colours are identified by a detected position of the blobs in the asymmetric pattern.

12. The method of claim 5, wherein:
    the blobs have different shapes;
    blobs with different shapes are presented with different colours; and
    the colours are identified by the detected shape of the blobs.

13. The method of claim 1, wherein a plurality of local exposure calibration parameters are calculated for corresponding regions and a global exposure calibration parameter is calculated as a blend of the plurality of local exposure calibration parameters.

14. The method of claim 13, wherein a ratio of the plurality of local exposure calibration parameters to the global exposure calibration parameter is used to calculate corresponding local thresholding values.

15. A display system comprising:
    a device for displaying a test pattern including a plurality of blobs;
    a camera for capturing an image comprising one or more of the plurality of blobs in the displayed test pattern;
    a processor configured to:
        calculate an exposure calibration parameter using a ratio of a maximum brightness level capable of being read by the camera to a maximum brightness level determined from the captured one or more blobs in the test pattern; and
        calibrate the exposure of the display system using the exposure calibration parameter.

16. The display system of claim 15 wherein when the image is underexposed, the maximum brightness level is measured from the captured image.

17. The display system of claim 15 wherein when the image is overexposed, the maximum brightness level is calculated as a theoretical maximum brightness level of displayed light based on the maximum brightness level measured from the capture image.

18. The display system of claim 17, wherein the theoretical maximum brightness level is calculated by measuring an intermediate brightness level and, considering a base value of light read by the camera, extrapolating the intermediate brightness level to provide the theoretical maximum brightness level.

19. The display system of claim 15, wherein at least one of the plurality of blobs comprises an inner area and an outer area surrounding the inner area, the inner area having a brightness level proximal a first end of a brightness range and the outer area having a brightness level proximal a second, opposite end of the brightness range.

20. The display system of claim 19, wherein the outer area has a brightness level at a maximum level of the brightness range and the inner area has a brightness level at or near a minimum level of the brightness range.

21. The display system of claim 19, wherein the blob comprises a clear boundary between the inner area and the outer area, or the blob comprises a ramp that transitions between the inner area and the outer area.

22. The display system of claim 19, further comprising a background area surrounding the outer area, wherein the background area has a brightness level at the opposite end of the brightness range from the outer area.

23. The display system of claim 19, wherein:
the blobs are arranged in an asymmetric pattern;
blobs at different positions withing the asymmetric pattern are displayed with different colours; and
the colours are identified by a detected position of the blobs in the asymmetric pattern; or
the blobs have different shapes;
blobs with different shapes are displayed with different colours; and
the colours are identified by a detected shape of the blobs.

24. The display system of claim 15, wherein a plurality of local exposure calibration parameters are calculated for corresponding regions and a global exposure calibration parameter is calculated as a blend of the plurality of local exposure calibration parameters.

25. The display system of claim 24, wherein a ratio of the plurality of local exposure calibration parameters to the global exposure calibration parameter is used to calculate corresponding local thresholding values.

\* \* \* \* \*